United States Patent
Nachbar et al.

(10) Patent No.: US 11,713,782 B2
(45) Date of Patent: Aug. 1, 2023

(54) INSERT FOR A BALL JOINT IN A MOTOR VEHICLE, BALL JOINT OR LINK HAVING AN INSERT OF THIS TYPE, AND METHOD FOR PRODUCING AN INSERT OF THIS TYPE, A BALL JOINT OF THIS TYPE OR A LINK OF THIS TYPE

(71) Applicant: ZF Friedrichshafen AG, Friedrichshafen (DE)

(72) Inventors: Frank Nachbar, Osnabrück (DE); Jan Pabst, Osnabrück (DE); Volker Grube, Diepholz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 396 days.

(21) Appl. No.: 16/481,508

(22) PCT Filed: Feb. 2, 2018

(86) PCT No.: PCT/EP2018/052595
§ 371 (c)(1),
(2) Date: Jul. 29, 2019

(87) PCT Pub. No.: WO2018/158030
PCT Pub. Date: Sep. 7, 2018

(65) Prior Publication Data
US 2019/0390705 A1 Dec. 26, 2019

(30) Foreign Application Priority Data
Mar. 3, 2017 (DE) .................. 10 2017 203 540.4

(51) Int. Cl.
*F16C 11/06* (2006.01)

(52) U.S. Cl.
CPC ...... *F16C 11/0638* (2013.01); *F16C 11/0685* (2013.01); *F16C 2220/04* (2013.01); *F16C 2326/05* (2013.01); *Y10T 403/32803* (2015.01)

(58) Field of Classification Search
CPC .............. F16C 11/0619; F16C 11/0623; F16C 11/0628; F16C 11/0633; F16C 11/0638;
(Continued)

(56) References Cited

U.S. PATENT DOCUMENTS 3,240,518 A * 3/1966 Herbenar ............ F16C 11/0619
403/165
5,772,352 A * 6/1998 Fukumoto ................ B60G 3/20
280/124.1
(Continued)

FOREIGN PATENT DOCUMENTS

DE 44 21 403 A1 12/1995
DE 297 01 902 U1 7/1998
(Continued)

OTHER PUBLICATIONS

German Office Action Corresponding to 10 2017 203 540.4 dated Oct. 30, 2018.
(Continued)

*Primary Examiner* — Josh Skroupa
*Assistant Examiner* — Kevin J Baynes
(74) *Attorney, Agent, or Firm* — Finch & Maloney PLLC

(57) ABSTRACT

An insert for a ball joint (19) in a motor vehicle. The insert having a first part-structure (6) for making at least partial slide-bearing contact with a joint ball (2). The first part-structure (6) can be connected, by over-molding, to a joint socket (17) and/or to a joint housing (18). The insert (1) can be positioned and/or handled to cover a pole surface, to increase the extraction force, the insert (1) has an open (Continued)

part-structure (20) such that a cage-like configuration can be produced for surrounding the joint ball (2).

14 Claims, 4 Drawing Sheets

(58) Field of Classification Search
CPC . F16C 11/0642; F16C 11/0685; F16C 11/069; F16C 2220/04; F16C 2326/05; B60G 7/005; Y10T 403/32729; Y10T 403/32737; Y10T 403/32803
See application file for complete search history.

(56) References Cited

U.S. PATENT DOCUMENTS

| | | | |
|---|---|---|---|
| 5,782,573 A | 7/1998 | Dorr et al. | |
| 6,109,816 A * | 8/2000 | Iwasaki | B60G 7/005 |
| | | | 403/122 |
| 8,152,186 B2 | 4/2012 | Jeong | |
| 8,550,741 B2 * | 10/2013 | Kuroda | F16C 11/0638 |
| | | | 403/143 |
| 8,864,155 B2 * | 10/2014 | Kuroda | B60G 7/005 |
| | | | 280/124.107 |
| 2011/0133423 A1 * | 6/2011 | Jeong | F16C 11/0671 |
| | | | 280/124.1 |
| 2012/0141192 A1 * | 6/2012 | Kwon | F16C 11/0657 |
| | | | 403/135 |
| 2013/0234412 A1 | 9/2013 | Kuroda | |
| 2018/0252259 A1 * | 9/2018 | Englebright | F16C 11/0685 |
| 2019/0291525 A1 * | 9/2019 | Lee | F16C 11/0642 |

FOREIGN PATENT DOCUMENTS

| | | | | |
|---|---|---|---|---|
| DE | 10 2010 036 644 A1 | 6/2011 | | |
| EP | 0 379 392 A1 | 7/1990 | | |
| EP | 0 801 238 A1 | 10/1997 | | |
| EP | 0972957 A2 * | 1/2000 | | F16C 11/0638 |
| EP | 3 023 652 A1 | 5/2016 | | |
| GB | 1 181 686 | 2/1970 | | |
| WO | 98/34036 A1 | 8/1998 | | |
| WO | WO-2007009423 A1 * | 1/2007 | | F16C 11/0628 |

OTHER PUBLICATIONS

International Search Report Corresponding to PCT/EP2018/052595 dated May 8, 2018.
Written Opinion Corresponding to PCT/EP2018/052595 dated May 8, 2018.

* cited by examiner

INSERT FOR A BALL JOINT IN A MOTOR VEHICLE, BALL JOINT OR LINK HAVING AN INSERT OF THIS TYPE, AND METHOD FOR PRODUCING AN INSERT OF THIS TYPE, A BALL JOINT OF THIS TYPE OR A LINK OF THIS TYPE

This application is a National Stage completion of PCT/EP2018/052595 filed Feb. 2, 2018, which claims priority from German patent application serial no. 10 2017 203 540.4 filed Mar. 3, 2017.

FIELD OF THE INVENTION

The invention relates to an insert for a ball joint in a motor vehicle, having a first part-structure for at least partial sliding contact with a joint ball, such that the first part-structure can be connected by over-molding to a joint socket and/or a joint housing. In addition the invention relates to a ball joint with a joint ball and such an insert, a chassis component or link with such an insert or ball joint, and a method for producing such an insert, such a ball joint and/or such a chassis component or link.

BACKGROUND OF THE INVENTION

An insert of the above-mentioned type is known from EP 3 023 652 A1. In that case the first part-structure is in the form of a cap element for covering a pole surface of the joint ball, such that the cap element seals an internal free space between the pole surface and the cap element well enough so that when the joint ball is over-molded no molding material can make its way into the free space. This ensures that after over-molding, the joint ball can both rotate about the longitudinal axis of the ball joint and also be tilted around the longitudinal axis.

It is true that direct over-molding of a joint ball with a pole surface is basically possible. However, in that case only twisting or rotational movement of the joint ball around the longitudinal axis of the ball joint is possible. In contrast, tilting movement, pivoting movement or oscillating movement of the joint ball is blocked. This, as a rule, undesired restriction of the freedom of movement is prevented by means of the first part-structure or the cap element.

A disadvantage, however, is that positioning the first part-structure or cap element inside a die for over-molding the joint ball, especially in an injection-molding die, is an elaborate process. Because of that, the options for over-molding the joint ball are also reduced.

Furthermore, it is disadvantageous that in the case of a joint socket and/or a joint housing made of plastic, the extraction force that can be reached for pulling the joint ball out of the joint socket and/or joint housing cannot be made sufficiently large. In particular the extraction force that can be achieved in the case of plastic components can be limited by the geometry that can be produced with the plastic components. The geometries that can be produced are limited on account of the necessary mobility of the joint ball, in particular in relation to tilting movement and/or on account of fitting space requirements and in relation to a requisite extraction force. Thus, there is a risk that the joint ball can be pulled out of the joint socket and/or joint housing by an extraction force which is lower than a required threshold value.

SUMMARY OF THE INVENTION

Accordingly, the purpose of the present invention is to develop further an insert, a ball joint and/or a method of the type mentioned to begin with, in such manner that the ability of the insert to be positioned and/or handled is improved. In particular, besides covering a pole surface the extraction force should be increased. Preferably, an alternative embodiment should be provided.

The objective upon which the invention is based is achieved by an insert, a ball joint, a chassis component or link and/or a method according to the independent claims. Preferred further developments of the invention emerge from the subordinate claims and from the description given below.

The insert is provided and/or designed for a ball joint in a motor vehicle. The insert has a first part-structure for at least partial sliding contact with a joint ball. Thus, the first part-structure can be at least in partial contact with the surface of the joint ball, or bear against it. This, however, enables relative movement of the joint ball with respect to the insert and/or the first part-structure. The first part-structure can be connected to a joint socket and/or to a joint housing by over-molding. In particular, the first part-structure can be integrated in a joint socket and/or a joint housing by over-molding. In that case the joint socket and/or the joint housing can form with the first part-structure a slide bearing for the joint ball. Furthermore, by means of an open part-structure a cage-like configuration for surrounding the joint ball can be produced.

Here, it is advantageous that due to the at least partial cage-like configuration, during the over-molding the insert can be at least partially penetrated and/or over-molded by a material. Furthermore, due to its cage-like form the insert can be arranged essentially around the joint ball. In that way the ability of the insert to be positioned and/or handled, particularly when being placed in a die for over-molding the joint ball, can be improved. Moreover, the cage-like form can enable the insert and/or a ball joint having such an insert to be made more rigid. Thereby, a higher or sufficiently high extraction force can be achieved. Preferably, surrounding of the joint ball is understood to mean that in relation to the cage-like configuration and/or to the open part-structure, the insert surrounds the ball joint a distance away therefrom. Thus, at least in relation to the cage-like configuration and/or the open part-structure the insert can be arranged without contact with the joint ball. Preferably, only the first part-structure is designed to contact the joint ball directly. In relation to the first part-structure the open part-structure can be regarded as a second part-structure.

By virtue of the open part-structure the cage-like form of the insert can be produced. In particular, herein "open" means that the part-structure has a plurality of recesses, openings and/or holes. In this, the open areas of the open part-structure can amount to a larger proportion of the structure than do the closed areas of the part-structure. The open part-structure and/or the insert can be made in one piece or of several components.

Preferably, the first part-structure is in the form of a cap element. Thus, the insert and/or the cap element can be designed to cover a pole surface of the joint ball. In turn, the cap element is designed to leave a free space between itself and the pole surface. By means of the cap element the free space can be sealed and/or closed relative to the surroundings. Here, the cap element enables the joint ball to be over-molded. By virtue of the cap element penetration of an injected mass or injection-molded mass into the free space is prevented. In particular, the free space is in the form of a segment of a sphere. Preferably the radius of the sphere segment of the free space and/or that of an inside of the cap element facing toward one of the pole surfaces corresponds to the radius of the joint ball. For that purpose on its side facing the pole surface, the cap element can be concave.

In particular, the cage-like structure is formed by means of the cap element and the open part-structure. To cover the pole surface, particularly at least in the area of the pole surface the cap element can be closed as such. Thus, at least in the area designed to cover the pole surface the cap element has no recesses, openings and/or holes.

Preferably, in the context of the present application a pole surface is understood to mean a surface area of the joint ball that forms an end surface of a ball stud. Compared with the spherical surface of the joint ball the pole surface is made flatter. For example, the pole surface is flat or substantially flat. The joint ball can be a free end of the ball stud. In particular, the pole surface can be in the form of a free end of the ball stud facing away from the joint pin.

In particular, "pivoting" or "tilting" of the ball stud is understood to mean movement of the joint ball relative to the insert, a joint socket and/or a joint housing, in which an angle enclosed between a longitudinal axis of the joint ball, in particular a ball stud, and the longitudinal axis of the insert, the joint socket and/or the joint housing changes. Preferably the pivoting or tilting takes place about the mid-point of the joint ball. In an untilted or null position of the joint ball the tilt angle is preferably zero and/or the longitudinal axis of the joint ball coincides with the longitudinal axis of the insert, joint socket and/or joint housing.

In particular, "rotation" or "twisting" of the joint ball is understood to mean a movement of the joint ball in which the joint ball twists or rotates relative to the insert, joint socket and/or joint housing about the longitudinal axis of the joint ball, in particular that of a ball stud.

The joint ball can be part of a ball stud. The ball stud can be part of a ball joint. The ball joint can comprise a joint socket and/or a joint housing. In particular, the joint ball is fitted so that it can move inside the joint socket and/or the joint housing.

Preferably, the open part-structure is connected to the first part-structure, in particular the cap element. In particular, the open part-structure is fixed firmly and/or essentially immovably on the first part-structure. The connection of the open part-structure to the first part-structure, in particular the cap element, can be designed to be releasable. Preferably, the cage-like configuration of the insert is formed by virtue of the connection of the open part-structure to the first part-structure, in particular the cap element. Due to its cage-like form and/or cage-like structure, the insert has a plurality of recesses, perforations and/or openings. The first part-structure and the open part-structure can be made as a single, integral component. Thus, the insert as a whole can be made in one piece.

In particular, the open part-structure is designed to surround the joint ball without touching it. Thus, the open part-structure is designed in such manner that when the insert is arranged on the joint ball, the open part-structure is a distance away from the surface of the joint ball. In particular, only the first part-structure is at least partially in contact with the joint ball. For example, in its cap element form the first part-structure can be in contact with the joint ball in a preferably ring-shaped area around the pole surface.

According to a further development the open part-structure is connected to the first part-structure, in particular the cap element, with interlock, and/or by friction and/or in a material-merged manner. In particular the open part-structure is fixed onto the first part-structure, specifically the cap element, by a plug-in connection or a clip-on connection. Thus, the open part-structure can be arranged on the first part-structure, specifically the cap element, without the need for tools. In that way the insert as a whole can be produced particularly simply and inexpensively.

Preferably, the insert has a reinforcing element. The reinforcing element can be designed to increase an extraction force. Specifically, the extraction force denotes the force required to pull the joint ball out of the cage-like configuration and/or the cage-like structure or out of a joint socket with the insert or a joint housing with the insert. Thus, the risk of undesired pulling-out of the joint ball from the insert, from a joint socket with the insert and/or from a joint housing with the insert, particularly by a force below a predetermined threshold, is reduced. In particular the reinforcing element is ring-like and/or annular. The reinforcing element is designed to extend around the joint ball a distance away therefrom. Preferably the reinforcing element has an inside diameter larger than the maximum outer diameter of the joint ball. In an untilted and/or null position of the joint ball, a plane of the reinforcing element can be orientated perpendicularly to a longitudinal axis of the joint ball and/or of a ball stud comprising the joint ball.

Preferably, the reinforcing element is arranged rotationally-symmetrical relative to and/or coaxially with a longitudinal axis of the insert. In particular, in the context of the present application a longitudinal axis is always understood to mean a central longitudinal axis. The insert, the joint ball, the joint socket, the joint housing and/or the ball joint can in each case be positioned rotationally-symmetrical relative to a longitudinal axis or central longitudinal axis. The reinforcing element can be part of the open part-structure. The reinforcing element can be made from a material with higher strength and/or rigidity than another material used for the at least partial over-molding of the insert.

In a further embodiment the insert has at least one or more fastening elements. In particular, the fastening elements are part of the open part-structure. In this case the fastening elements can each be strand-like or rod-like. Preferably the fastening elements are designed to be arranged a distance away from the joint ball. In an untilted and/or null position of the joint ball relative to the insert, the fastening elements can extend parallel to the longitudinal axis of the insert, the joint ball and/or the ball stud. In particular, the reinforcing element is connected to the cap element by the fastening elements. The fastening element, in particular an end thereof facing away from the cap element and/or toward the reinforcing element, can be made elastic. Preferably, transversely to its longitudinal extension the fastening element is elastic. In this way the fitting and/or connection of the reinforcing element to the fastening elements can be made easier. In particular the reinforcing element can be pushed, preferably from outside, over the ends of the fastening elements in order to form an interlocked and/or frictional connection between the fastening elements and the reinforcing element.

Preferably, a first end of the fastening elements is in each case fixed to the first part-structure, in particular the cap element, with interlock or by friction and/or in a material-merged manner. Starting from the first part structure. In particular the cap element, the fastening elements can extend essentially parallel to one another in the direction of the reinforcing element. In particular, a second end of the fastening elements remote from the first end is connected to the reinforcing element with interlock, by friction or in a material-merged manned. Preferably, the connection of the fastening elements to the first part-structure, particularly the cap element, and/or their connection to the reinforcing element, is a plug-in or clip-on connection. This simplifies the formation of the connections. Particularly in combination with the cap element, the fastening elements and the reinforcing element can form the open part-structure. Preferably the fastening elements, in particular three fastening elements, are arranged uniformly on the reinforcing element.

A ball joint according to the invention comprises a joint ball and an insert according to the invention. In particular, the ball joint has a joint socket, a joint housing and/or a ball stud. The ball stud can have the joint ball and a joint pin. In this case the joint socket and/or the joint housing can be designed to hold the joint ball of the ball stud so that it can move in the manner of a slide bearing. The joint socket can be made with more than one part, in particular two parts. Preferably the insert is at least partially or fully integrated in the joint socket and/or the joint housing. The insert can be at least partially or completely over-molded by means of a suitable process for producing the joint socket and/or the joint housing.

A corresponding process can for example be in the form of an injection-molding process. Thus, the insert can be partially or completely enclosed in the material of the joint socket and/or the joint housing. In that way the position of the insert within the joint socket and/or the joint housing can be fixed so that any undesired position change of the insert relative to the joint socket and/or the joint housing is reliably prevented. Preferably, the reinforcing element is fully integrated in the joint socket and/or the joint housing. In particular, integrated is understood to mean a complete or partial embedding of the insert in the material of the joint socket and/or the joint housing, in such manner that the material contacts, positions and/or holds the insert.

Preferably, the joint socket and/or the joint housing is made from a plastic material, in particular a fiber-reinforced plastic. In particular the insert, the first part-structure, the open part-structure, the cap element, the fastening element and/or the reinforcing element is made from plastic. In this case the insert, the first pad-structure, the open part-structure, the cap element, the fastening element and/or the reinforcing element can be made of a plastic material more rigid than the plastic material used for over-molding the insert. Preferably, the insert is made from different materials. The cap element can be made from a plastic material and the fastening element and/or the reinforcing element can be made of metal. Thus, the insert can be produced as a hybrid component made of at least two different materials.

Preferably, the fastening elements are partially integrated in the joint socket and/or the joint housing. In particular, an end of the fastening elements facing toward the reinforcing element is fully integrated in the material of the joint socket and/or the joint housing. An end of the fastening elements facing away from the reinforcing element and toward the first part-structure, in particular the cap element, cannot be integrated in the material of the joint socket and/or the joint housing. In particular the first pad-structure, especially the cap element, cannot be integrated in the material of the joint socket and/or the joint housing. Thus, in the area of the first part-structure, especially the cap element, and/or the end of the fastening elements facing toward the first part-structure, especially the cap element, over-molding of the cap element and/or the end of the fastening elements facing toward the cap element can be omitted. This saves material. By virtue of the fastening elements held in the material of the joint socket and/or the joint housing, the first part-structure connected to the fastening elements, in particular the cap element, is also held reliably. In an alternative embodiment however, the insert can also be completely integrated in the material of the joint socket and/or the joint housing, including the first part-structure. In another alternative embodiment the reinforcing element and the fastening elements can be completely integrated in the material of the joint socket and/or the joint housing, and the first part-structure, particularly the cap element, partially so. In that case, in particular a fastening area of the fastening elements can be enclosed with the cap element by the material. Only a side of the cap element facing away from the joint ball can remain not integrated in the material, in particular in order to save material.

Preferably the first part-structure, particularly the cap element, covers the pole surface to form a seal. In that way, when the insert is over-molded while producing the joint socket and/or the joint housing, penetration of the material into the free space between the cap element and the joint ball can be avoided. In particular, the reinforcing element is arranged in an area of the joint ball remote from the pole surface and/or facing toward a joint pin. Preferably, the reinforcing element is a distance away from the joint ball. A number of fastening elements a distance away from the joint ball can extend from the first part-structure, in particular the cap element, to the reinforcing element. Thus, the first part-structure and especially the cap element can constitute a first end of the insert and the reinforcing element a second end of the insert facing away from the first end. The first end of the insert can be associated with the pole surface of the joint ball and the second end of the insert is associated with an area of the joint ball facing toward the joint pin.

Preferably, the open part-structure is a distance away from the joint ball. In that way the gap between the open part-structure and the joint ball can be at least partially filled with a material, in particular injection-molding material. In particular, the open part-structure is at least partially or even completely surrounded by the material or injection-molding material.

In a method according to the invention, an insert according to the invention and/or a ball joint according to the invention is produced in which, in particular, a cage-like structure for surrounding the joint ball is formed. In particular, the insert and/or the ball joint produced by the method according to the invention is an insert and/or a corresponding ball joint as described above. Preferably, the method is further developed in accordance with all the design features explained in connection with the insert and/or the ball joint according to the invention described herein.

Preferably the first part-structure, particularly in its form as a cap element, is produced first. Then, the fastening elements can be connected to the first part-structure, in particular the cap element. Thereafter, the reinforcing element is connected to the fastening elements. In that way the insert is produced. Alternatively the insert can be made in a single step as a one-piece or integral structure. To produce the ball joint according to the invention, in the first part-structure, particularly its cap element, this preassembled insert can be positioned on the joint ball or a pole surface of the joint ball of the ball stud. For that purpose the reinforcing element of the insert can be moved over the joint ball in the direction of the joint pin until the cap element is in contact with the joint ball and is covering the pole surface. Then, the ball stud together with the insert can be introduced into a die. By means of the die and/or a holding device the insert and/or the ball stud can be held in a desired position. Alternatively the preassembled insert can be inserted into the die and positioned in it first. Then the joint ball can be introduced into and positioned in the insert held in the die. For example, the position of the joint ball relative to the insert can be established by adjusting the position of the ball stud. According to a further alternative the ball stud can be positioned in a die first. Thereafter, the insert is positioned on the joint ball and/or in the die. The ball stud can be held or positioned by means of the die and/or a suitably designed holding device. Then the insert can be over-molded at least partially or completely with a material, in particular a plastic material. In that way a joint socket and/or a joint housing can be produced.

By virtue of the insert the joint socket and/or the joint housing made of plastic and/or fiber-reinforced plastic can be reinforced in such manner that the extraction force required for pulling the joint ball out of the joint socket and/or joint housing, is increased. In this, it is advantageous that the insert as a whole can be fitted or plugged together without using tools.

Of particular advantage is a chassis component and/or link having an insert and/or ball joint according to the invention. Preferably, the insert and/or the ball joint is integrated in a chassis component or link for a motor vehicle, or is designed as part of a chassis component or link. In automotive engineering ball joints are used in very many ways. In particular, in chassis ball joints serve to articulate chassis elements or components such as control arm components, wheel carriers, track-rods or the like to one another or to the vehicle body or to an axle carrier attached thereto. In this context, a ball joint can usually consist of a joint housing open on at least one side, with a housing aperture and a ball stud fitted into the housing aperture so that it can pivot relative to the joint housing, the joint pin of the ball joint projecting out of the housing aperture. Between the joint housing and the joint ball on the ball stud there can be arranged a joint socket, which reduces the friction and thus the wear of the joint despite the sometimes high operational loads.

BRIEF DESCRIPTION OF THE DRAWINGS

Below, the invention is explained in greater detail with reference to the figures, in which the same indexes denote the same, similar or functionally equivalent components or elements. The figures show.

DETAILED DESCRIPTION OF THE PREFERRED EMBODIMENTS

Figure 1:
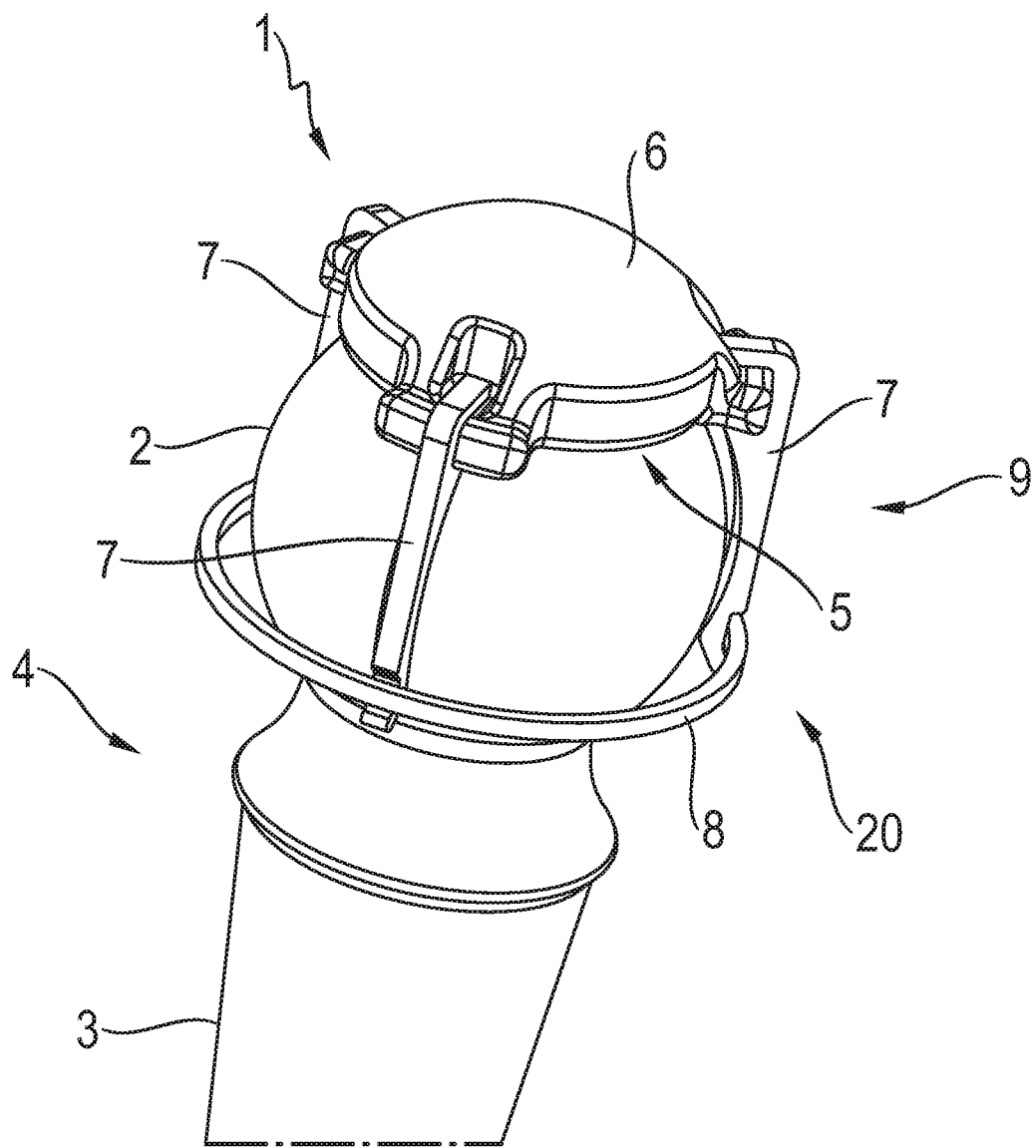
FIG. 1: A perspective view of an insert according to the invention arranged on a joint ball.

FIG. 1 shows a perspective view of an insert 1 according to the invention arranged on a joint ball 2. The joint ball 2 is connected to a joint pin 3. Together, the joint ball 2 and the joint pin 3 form an integrally formed ball stud 4. The ball stud 4 and the insert 1 can be part of a ball joint.

The insert 1 has a first part-structure 6. In this example embodiment the first part-structure 6 is in the form of a cap element 6. An end of the joint ball 2 facing away from the joint pin 3 has a pole surface 5. The pole surface 5 cannot be seen in detail in the figure, since the pole surface 5 is covered by the cap element 6 of the insert 1. The cap element 6 is ring-shaped and rests on the spherical surface of the joint ball 2 around the pole surface 5.

The insert 1 has a number of fastening elements 7. In this example there are three fastening elements 7. In each case a first end of the fastening elements 7 is connected to the cap element 6. Starting from the cap element 6 the fastening elements 7 extend in the direction toward the joint pin 3.

Furthermore, the insert 1 has a reinforcing element 8. In this example embodiment the reinforcing element 8 is in the form of a ring. The ends of the fastening elements 7 remote from the cap element 6 are in each case connected to the reinforcing element 8. The reinforcing element 8 is arranged in an area or at an end of the joint ball 2 facing away from the pole surface 5 and toward the joint pin 3. The fastening elements 7 are uniformly spaced relative to one another and arranged around the joint ball 2.

The insert 1 has a cage-like structure 9. In this case, by means of the fastening elements 7 and the reinforcing element 8 an open part-structure 20 is formed. The cage-like structure 9 is formed by a co-operation or by a combination of the open part-structure, namely the fastening elements 7 and the reinforcing element 8, with the cap element 6. In this, it is in particular the fastening elements 7 and the reinforcing element 8 which form the cage-like structure of the insert 1. The cage-like configuration, the open part-structure and/or the cage-like structure 9 surrounds the joint ball 2 a distance away therefrom. Only the cap element 6 is in contact with the surface of the joint ball 2.

Figure 2:
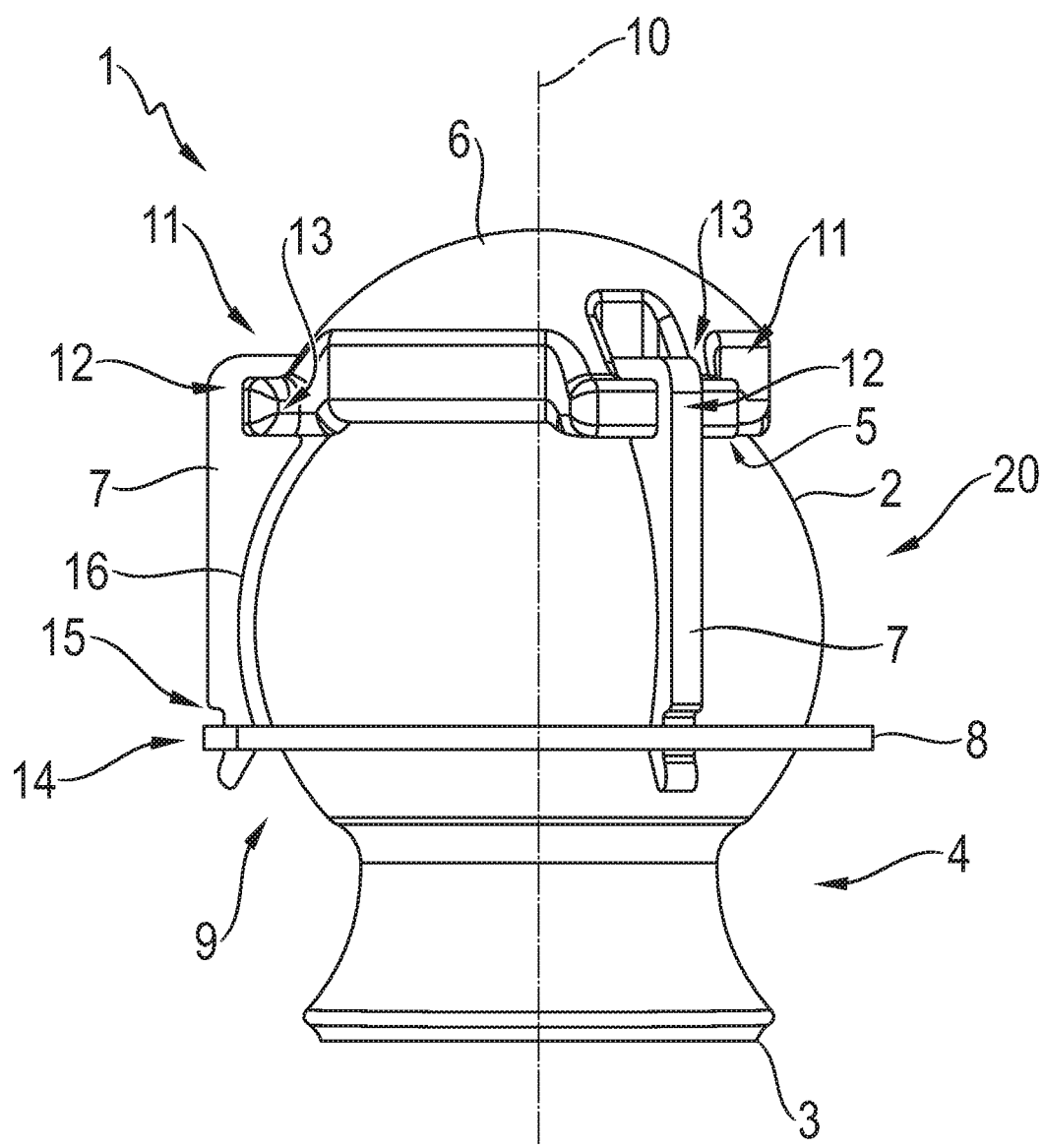
FIG. 2: A side view of the insert according to the invention shown in FIG. 1, FIG. 3: A view from above, of the insert according to the invention shown in FIG. 1, and FIG. 4: Another side view of the insert according to the invention shown in FIG. 1, in a partially over-molded condition.

FIG. 2 shows a side view of the insert 1 according to the invention illustrated in FIG. 1. The insert 1 has a longitudinal axis 10 which is a central longitudinal axis. The ball stud 4 also has a longitudinal axis or central longitudinal axis, and in the relative position or null position of the ball stud 4 shown in the figure in relation to the insert 1, the longitudinal axis of the ball stud 4 coincides with the longitudinal axis 10 of the insert 1.

The ends of the fastening elements 7 facing toward the cap element 6 are joined to the cap element 6 by a connector 11. In this example embodiment the connector 11 is in the form of a clip connection 11. For this, the fastening element 7 has in each case a first clip element 12 that co-operates with a second clip element 13 which is associated with the cap element 6 and corresponds with the first clip element 12.

Each of the ends of the fastening elements 7 facing toward the reinforcing element 8 is joined to the reinforcing element 8 by a connector 14. In this example embodiment the connector 14 is in the form of a catch 14. For this, in each case the end of the fastening element 7 facing toward the reinforcing element 8 has a catch device 15. The catch device 15 is designed to receive or hold the reinforcing element 8. In this case the catch device 15 is essentially in the form of an indentation in which the reinforcing element 8 can engage. To enable the reinforcing element 8 to engage, the fastening elements 7 are elastically deformable. In this example embodiment, to form the connections 14 the reinforcing element 8 is pushed from the outside over the ends of the fastening elements 7 facing away from the cap element 6. This at first elastically deforms the fastening elements 7 inward in the direction toward the longitudinal axis 10. As soon as reinforcing element 8 reaches the catch devices 15, the fastening elements 7 spring back again a short way outward. This connects the reinforcing element 8 sufficiently securely to the fastening elements 7.

Each fastening element 7 has a curved section 16. The curved section 16 is concave and extends from the cap element 6 in the direction toward the reinforcing element 8. The curved section 16 faces toward the joint ball 2. The curved section 16 is designed such that the curved section 16 is a uniform distance away from the surface of the joint ball 2. By virtue of the curved section 16 it is ensured that the fastening element 7 is as a whole and/or uniformly a distance away from the surface of the joint ball 2. Moreover, the fastening elements 7 are essentially strand-like or rod-like. In that way relatively large intermediate spaces can be formed between the fastening elements 7 spaced a distance apart from one another. Furthermore, the fastening elements 7 extend parallel to the longitudinal axis 10 of the insert 1.

Figure 3:
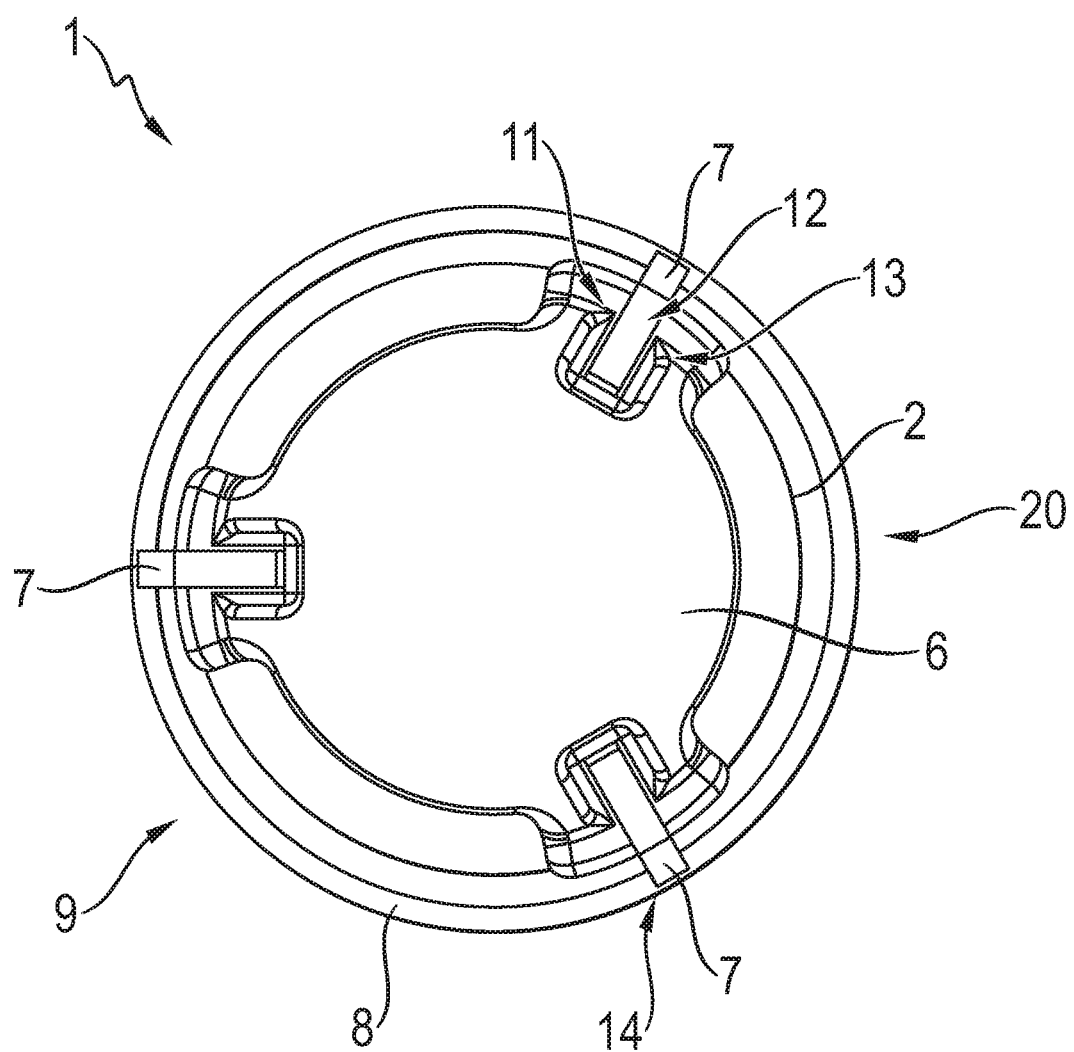

FIG. 3 shows a view from above the insert 1 according to the invention illustrated in FIG. 1. Here, it can be seen clearly that the reinforcing element 8 has an inside diameter which is larger than the maximum outer diameter of the joint ball 2. This simplifies the positioning of the ready-preassembled insert 1 on the joint ball 2 or the introduction of the joint ball 2 into the insert 1.

Figure 4:
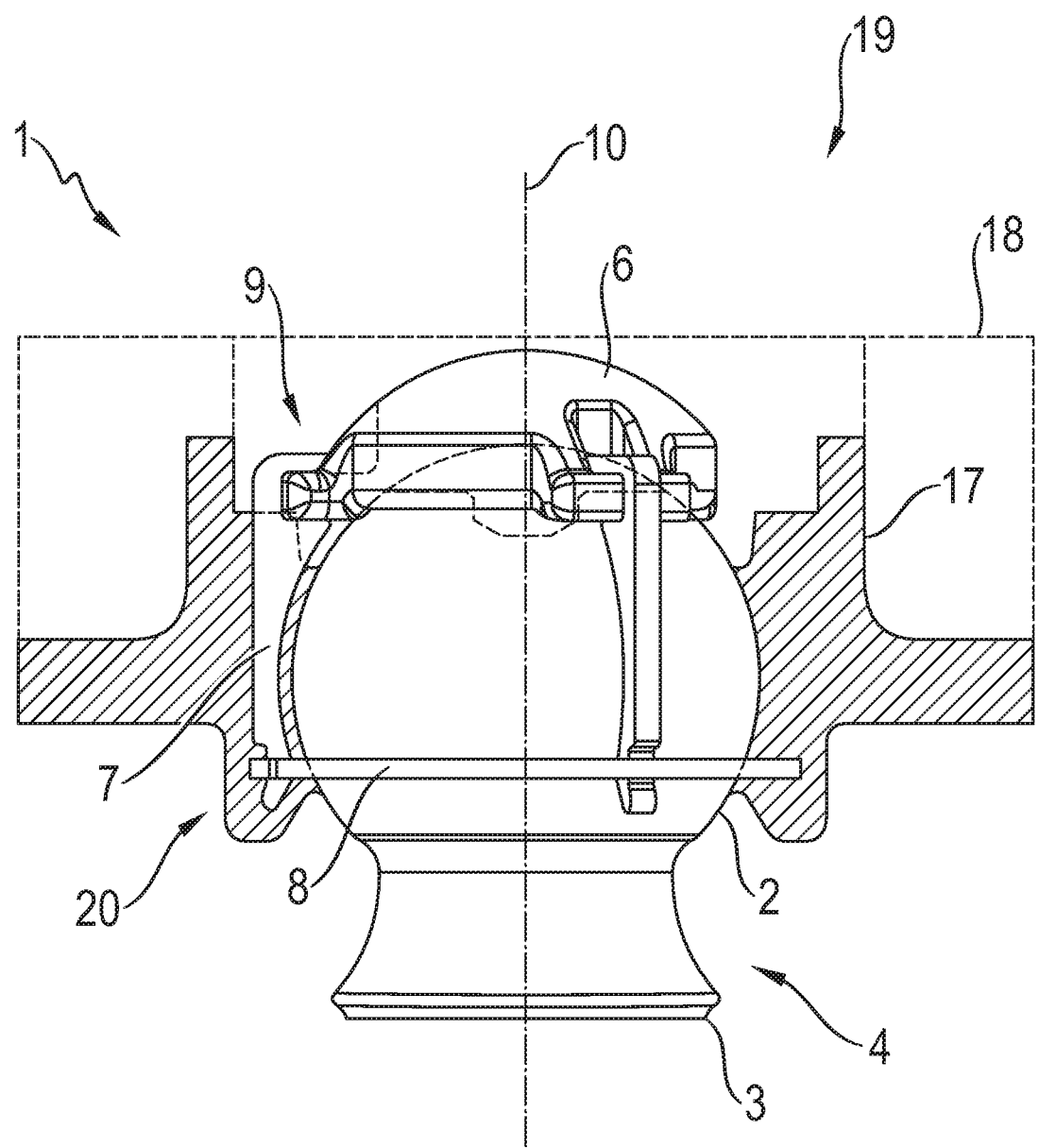

FIG. 4 shows a further view of the insert 1 according to the invention illustrated in FIG. 1, in a partially over-molded condition. In this example embodiment the insert 1 is partially integrated in a joint socket 17 or over-molded in order to produce the joint socket 17. Here, the open part-structure 20 is partially over-molded with a plastic in such manner that the reinforcing element 8 is completely over-molded. In this example only the ends of the fastening elements 7 facing toward the cap element 6 and the cap element 6 itself are not integrated in the joint socket by over-molding. In an alternative embodiment the insert 1 can be fully integrated in a joint socket, or over-molded completely.

The joint socket 17 rests at least partially in contact with the surface of the joint ball 2. In this case, the joint ball 2 is fitted so that it can move within the joint socket 17. Furthermore, in the example embodiment shown here the joint socket 17 is arranged inside a schematically indicated joint housing 18. Thus, as a whole a ball joint 19 is shown, which comprises a joint housing 18 with a joint socket 17 arranged in it, and inside the joint socket 17 a joint ball 2 of a joint pin 4 is fitted and able to move in the joint socket 17. The joint housing 18 can be part of a chassis component and/or a link, or it can be integrated therein.

In this case, due to the cage-like structure 9 the cap element 6 for covering a pole surface of the joint ball 2 is held securely. Furthermore the joint socket 17, made of plastic in this example, is additionally strengthened and made more rigid by the reinforcing element 8 and/or the fastening elements 7. This increases the extraction force required for pulling the joint ball 2 out of the joint socket 17 and the joint housing 18.

INDEXES

1 Insert
2 Joint ball
3 Joint pin
4 Ball stud
5 Pole surface
6 First part-structure (cap element)
7 Fastening element
8 Reinforcing element
9 Cage-like structure
10 Longitudinal axis
11 Connector (clip connection)
12 First clip element
13 Second clip element
14 Connector (catch connection)
15 Catch device
16 Curved section
17 Joint socket
18 Joint housing
19 Ball joint
20 Open part-structure

The invention claimed is:

1. An insert and joint ball for a ball joint in a motor vehicle, the insert comprising:
   a first part-structure being at least in partial slide-bearing contact with the joint ball,
   the first part-structure being connectable, by over-molding, to at least one of a joint socket and a joint housing,
   an open part-structure being designed as a cage-like configuration,
   the open part-structure having a plurality of axially extending fastening elements, each of the fastening elements having axially opposite first and second ends and a curved section therebetween, the curved section of the fastening elements having an inner surface that is radially separated from and parallel to an outer surface of the joint ball, and only the first end of the fastening elements directly contact the first part-structure, and
   the open part-structure being configured to radially surround the joint ball and to be radially separated from the joint ball by an open gap.

2. The insert according to claim 1, wherein
   the first part-structure is a cap element for covering a pole surface of the joint ball, and
   the cap element is designed to contact the joint ball and form at least one of a sealed free space and a closed free space between the pole surface and the cap element.

3. The insert according to claim 1, wherein
   the first part-structure has a closed design and contacts the joint ball to cover a pole surface of the joint ball,
   the open part-structure is connected to the first part-structure and forms a cage-like structure.

4. The insert according to claim 1, further comprising one of:
   the open part-structure is connected to the first part-structure either via an interlock, or by friction, or in a material-merged manner,
   the open part-structure is fastened to the first part-structure by either a plug-in connection or a clip-on connection, or
   the first part-structure and the open part-structure are produced together as a single, one-piece component.

5. The insert according to claim 1, further comprising a reinforcing element designed to increase an extraction force for pulling the joint ball out of at least one of the cage-like configuration, a cage-like structure, a joint socket having the insert, and a joint housing having the insert, and
   the reinforcing element has an annular shape and is configured to radially surround the joint ball.

6. The insert according to claim 5, wherein the reinforcing element is connected to the second ends of the fastening elements and is arranged at least one of:
   rotationally-symmetrical relative to a central longitudinal axis of the insert, and
   coaxially with the central longitudinal axis of the insert, and
   the reinforcing element is part of the open part-structure.

7. The insert according to claim 1, further comprising
   the fastening elements are uniformly spaced from each other around a circumference of the joint ball such that intermediate spaces are formed between the fastening elements, the intermediate spaces being open such that an interior of the insert is open to an exterior of the insert, and the fastening elements are at least one of a strand-like form and a rod-like form.

8. The insert according to claim 7, wherein the first end of the fastening elements is, in each case, one of fixed via interlock, by friction, and in a material-merged manner to the first part-structure, the second end of the fastening elements, remote from the first end, is, in each case, one of connected via interlock, by friction, and in a material-merged manner to a reinforcing element, and the fastening elements and the reinforcing element form the open part-structure.

9. A ball joint with a joint ball and an insert having a first part-structure which is at least in partial slide-bearing contact with the joint ball, the first part-structure being connectable, by over-molding, to at least one of a joint socket and a joint housing, an open part-structure being designed as a cage-like configuration, the open part-structure having a plurality of axially extending fastening elements, each of the fastening elements having axially opposite first and second ends and a curved section therebetween, the curved section of the fastening elements having an inner surface that is radially separated from and parallel to an outer surface of the joint ball, and only the first end of the fastening elements directly contacts the first part-structure, the open part-structure being configured to radially surround the joint ball and to be radially separated from the joint ball, and the insert being at least one of:

at least partially integrated in at least one of the joint socket and the joint housing, and at least partially over-molded by an injection-molding process to produce the at least one of the joint socket and the joint housing.

10. The ball joint according to claim 9, wherein the at least one of the joint socket and the joint housing is made from a fiber-reinforced plastic material, and the at least one of the joint socket and the joint housing is partially formed between the open part-structure and the joint ball.

11. The ball joint according to claim 9, wherein the open part-structure is a spaced from the joint ball, the spacing between the open part-structure and the joint ball is at least partially filled with an injection-molded material such that the open part-structure is at least partially surrounded by the injection-molded material both on radially interior and radially exterior sides of the open part-structure.

12. The ball joint according to claim 9, wherein the first part-structure forms a cap element and covers and seals a pole surface of the joint ball, a reinforcing element is arranged to surround an area of the joint ball that is at least one of remote from the pole surface of the joint ball and faces toward a joint pin, the reinforcing element is arranged spaced away from the joint ball, and the plurality of fastening elements extend from the cap element to the reinforcing element.

13. The ball joint according to claim 9, wherein the ball joint and the insert are integrated into at least one of a chassis component and link of a motor vehicle.

14. A method for producing a ball joint comprising an insert which is integrated into a chassis component or link of a motor vehicle, the insert having a first part-structure which is at least in partial slide-bearing contact with a joint ball, the method comprising:

forming the insert to have an open part-structure designed as a cage-like configuration to surround the joint ball, forming the open part-structure with a plurality of axially extending fastening elements, each of the fastening elements having axially opposite first and second ends and a curved section therebetween, and directly connecting only the first end of the fastening element to the first part-structure, supporting the open part-structure on the first part-structure such that the open part-structure radially surrounds the joint ball and is radially separated from the joint ball by an open gap, connecting the first part-structure of the insert, by over-molding, to at least one of a joint socket and a joint housing, and filling the open gap between the open part-structure and the joint ball by over-molding to encase the open part-structure within injection-molded material.

* * * * *